US010867229B2

(12) United States Patent
Durak et al.

(10) Patent No.: US 10,867,229 B2
(45) Date of Patent: Dec. 15, 2020

(54) EFFICIENT, SECURE, AND SAFE SYSTEM AND METHOD FOR STORING AND MONITORING DATA USED FOR REFILLING COMPRESSED-GAS TANKS

(71) Applicant: Bauer Compressors, Inc., Norfolk, VA (US)

(72) Inventors: Tahsin Durak, Norfolk, VA (US); Anthony B. Bayat, Virginia Beach, VA (US); Michael R. Sayre, Virginia Beach, VA (US); Vincent P. Adams, Norfolk, VA (US)

(73) Assignee: BAUER COMPRESSORS, INC., Norfolk, VA (US)

( * ) Notice: Subject to any disclaimer, the term of this patent is extended or adjusted under 35 U.S.C. 154(b) by 67 days.

(21) Appl. No.: 16/106,744

(22) Filed: Aug. 21, 2018

(65) Prior Publication Data

US 2019/0220720 A1 Jul. 18, 2019

Related U.S. Application Data

(60) Provisional application No. 62/618,777, filed on Jan. 18, 2018.

(51) Int. Cl.
*G06K 19/06* (2006.01)
*G06K 19/07* (2006.01)
*G06K 7/10* (2006.01)
*G06Q 10/00* (2012.01)

(52) U.S. Cl.
CPC ..... *G06K 19/0723* (2013.01); *G06K 7/10297* (2013.01); *G06K 2019/06253* (2013.01); *G06Q 10/00* (2013.01)

(58) Field of Classification Search
CPC ......... G06K 19/07749; G06K 19/0723; G06K 19/07758; G06K 19/04; G06Q 10/087; B65D 2203/10
USPC ................. 235/492; 340/572.1, 572.7, 572.8
See application file for complete search history.

(56) References Cited

U.S. PATENT DOCUMENTS

| 2005/0051624 A1* | 3/2005 | Kipp ..................... B65D 51/24 235/385 |
| 2016/0092851 A1* | 3/2016 | De Berg Hewett ......... G06Q 20/401 705/15 |

* cited by examiner

*Primary Examiner* — Jamara A Franklin
(74) *Attorney, Agent, or Firm* — Peter J. Van Bergen

(57) ABSTRACT

A tank data storing and monitoring system and method have an RFID tag coupled to and associated with a tank. The RFID tag has a unique identity specified by a unique identifier stored electronically on the RFID tag. Also included are an internet-accessing computer and database. The database stores data unique to the tank having the RFID tag coupled thereto. An RFID reader coupled to the computer is used to read only the unique identifier of the RFID tag. The computer accesses the data unique to the tank stored on the database using the unique identifier.

26 Claims, 7 Drawing Sheets

EFFICIENT, SECURE, AND SAFE SYSTEM AND METHOD FOR STORING AND MONITORING DATA USED FOR REFILLING COMPRESSED-GAS TANKS

Pursuant to 35 U.S.C. § 119, the benefit of priority from provisional application 62/618,777, with a filing date of Jan. 18, 2018, is claimed for this non-provisional application.

CROSS-REFERENCE TO RELATED PATENT APPLICATIONS

This patent application is co-pending with one related patent application entitled "TANK SUPPORT SYSTEM INCORPORATING TANK IDENTIFICATION", application Ser. No. 15/619,746, filed Jun. 12, 2017, and owned by the same assignee as this patent application.

FIELD OF THE INVENTION

The invention relates generally to re-fillable compressed-gas tanks, and more particularly to a system and method for storing and monitoring data used to refill compressed-gas tanks.

BACKGROUND OF THE INVENTION

Tanks that store compressed gas are used in a variety of commercial, industrial, recreational, governmental, healthcare, and firefighting and other rescue/safety applications and environments. In almost all cases, the tanks are refillable and reusable over the course of their useful life. Regardless of the type of tank and the gas it is intended to store, compressed-gas tanks are subject to a variety of regulations governing tank identification, use, safety, and record keeping.

Traditionally, the filling or refilling of reusable compressed-gas tanks, as well as the data/record keeping associated therewith, was a manual operation prone to operator error as well as being inherently dangerous to a refilling operator. More recently, "radio frequency identification" (RFID) tags have been affixed to tanks to help identify important information related to the tank, e.g., the tank's identification, purpose, owner, minimum/maximum fill pressures, tank filling parameters, operating pressures, type of gas the tank is designed to store, storage environment information/regulations, tank test and/or certification dates, tank end-of-life date, etc. Typically, the RFID tag is read prior to some type of manual or automated filling operation. The information read from the RFID tag is used to improve the efficiency and safety associated with the filling operation.

In terms of compressed-gas tank filling operations, conventional RFID tag reading operations introduce efficiency problems and can introduce safety concerns. With respect to efficiency, RFID tag reading relies on proper manual movement/positioning of a manually-manipulated RFID reader, or a properly positioned fixed-location RFID reader. At a minimum, improper RFID reader positioning leads to delays in a tank refilling operation. To combat this issue, higher-power RFID readers (e.g., on the order of 2 watts or more) are relied upon to reduce the reader's sensitivity to reader-to-tag positioning. Unfortunately, the use of higher-power RFID readers introduces potential safety issues.

In terms of safety, it is relevant that most compressed-gas tank-filling operations involve the presence of numerous tanks in an environment equipped to perform the tank filling operations. In these multi-tank environments, when operators rely on higher-power RFID readers (e.g., on the order of 2 watts or more) to reduce RFID positioning concerns relative to an RFID tag as described above, crosstalk between nearby RFID tags can cause incorrect tag-to-tank associations that are subsequently relied upon by a filling operator or an automated filling machine. When this type of error occurs in either a manual or automated tank filling operation, the results can be disastrous as a refilling operator/machine relies on the information it receives from its reader to institute a tank filling operation. That is, an incorrect tag-to-tank association can cause a tank to be over or under pressurized, can cause an out-of-certification tank to be filled, etc. Furthermore, higher-power RFID readers can generate error warnings when operated near electrically-conductive structures. At a minimum, the generation of such error warnings affects the efficiency of a tank filling operation.

In terms of record keeping, RFID tag-based systems rely on the storage of tank-related data on the tank's RFID tag as mentioned above. That is, each tank's RFID tag stores "static" data (e.g., tank serial number, tank manufactured date, tank end-of-life date, etc.) as well as "dynamic" data (e.g., last fill date, last maintenance date, current tank owner, etc.) that is updated or changed by an RFID read/write device as needed. However, reliance on RFID tag-storage for record keeping presents a number of problems. For example, many compressed-gas tanks are subject to harsh environments (e.g., SCBA cylinders used in underwater or fire environments) and/or rough handling that can damage or destroy an RFID tag. Furthermore, the use of higher power RFID read/write devices can be the source of the aforementioned crosstalk issues resulting in erroneous data reads from (or writes to) the wrong RFID tag.

SUMMARY OF THE INVENTION

Accordingly, it is an object of the present invention to provide a method and system that efficiently, securely, and safely monitors data used in the refilling of compressed-gas tanks.

Other objects and advantages of the present invention will become more obvious hereinafter in the specification and drawings.

In accordance with the present invention, a tank data storing and monitoring system and method have an RFID tag coupled to and associated with a tank. The RFID tag has a unique identity specified by a unique identifier stored electronically on the RFID tag. Also included are a computer adapted to access the internet and a database adapted to be accessible via the internet. The database stores data unique to the tank having the RFID tag coupled thereto. An RFID reader coupled to the computer is used to read only the unique identifier of the RFID tag. The computer accesses the data unique to the tank stored on the database using the unique identifier. In an additional aspect of the invention, a unique tank support system can be used to hold/support the tank during the RFID tag reading process. In yet another aspect of the invention, the RFID tag can be disposed within a unique tag holder to properly position the RFID tag's antenna for the RFID tag reading process.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
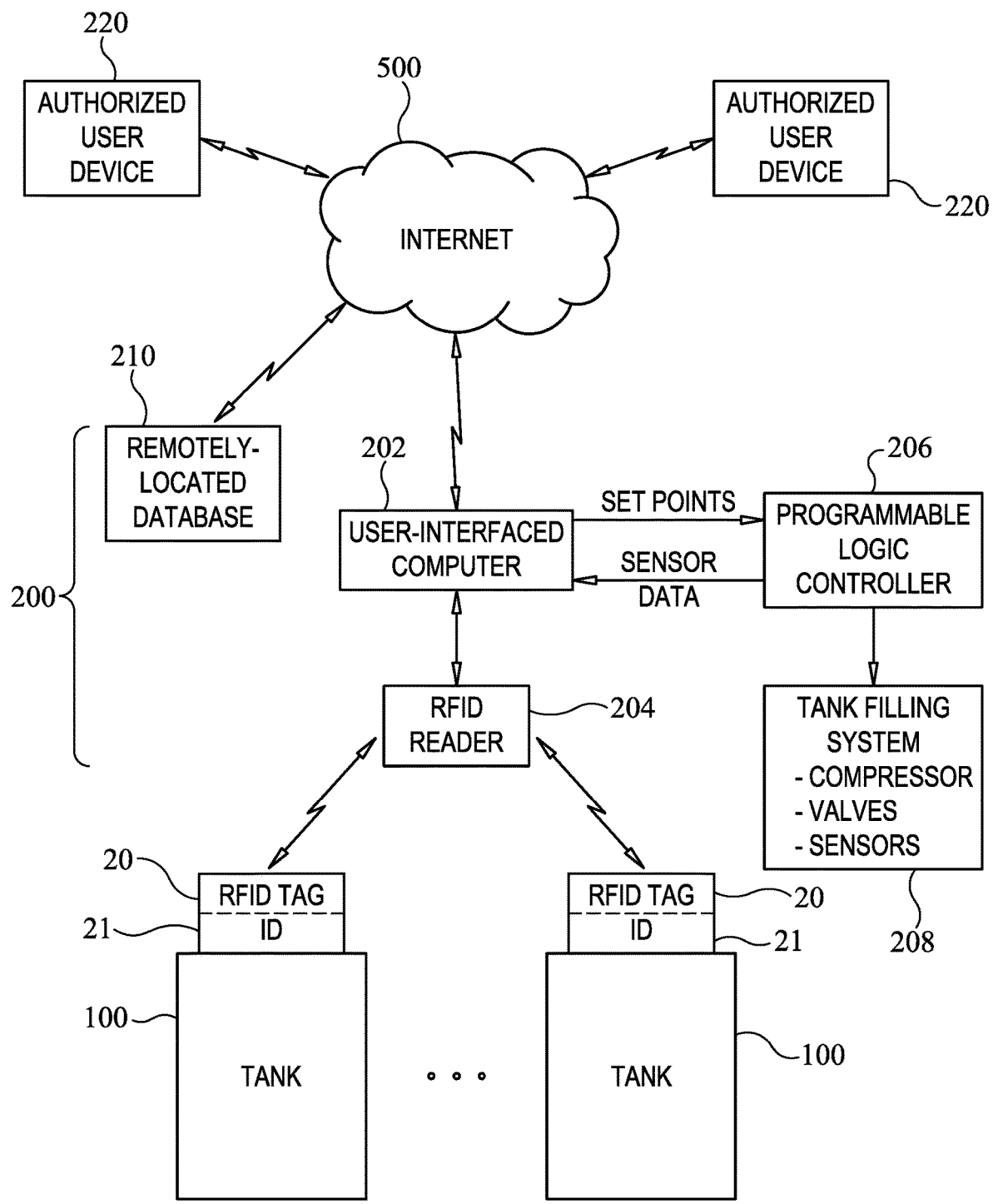
FIG. 1 is a schematic view of a data storing and monitoring system for re-fillable compressed-gas tanks in accordance with an embodiment of the present invention.

Referring now to the drawings and more particularly to FIG. 1, a data storing and monitoring system for re-fillable compressed-gas tanks in accordance with an embodiment of the present invention is shown and is referenced generally by numeral 200. In the illustrated embodiment and as will be explained further below, system 200 includes tank-filling controls and elements used to fill/re-fill one or more compressed-gas tanks 100 such as SCBA cylinders. Each tank 100 has its own uniquely-identifiable RFID tag 20 coupled thereto. RFID tag 20 can be attached/installed to tank 100 by the tank manufacturer, or can be coupled to tank 100 using, for example, a unique holder (not shown in FIG. 1) that improves readability of RFID tag 20 as will be described later herein in an exemplary embodiment. As is known in the art, RFID tag 20 has a unique identifier ("ID") 21 stored electronically thereon and has readable/writable memory (not shown). ID 21 uniquely identifies RFID tag 20, but is unrelated to any use or purpose with which RFID tag 20 will be associated. To achieve the efficiency, safety and security provided by the present invention, only ID 21 is read from RFID tag 20. That is, system 200 does not read any data that is or might be stored on the memory portion of RFID tag 20. Further, system 200 does not write any data to RFID tag 20. Accordingly, in one embodiment of the present invention, the only data electronically stored on RFID tag 20 is ID 21.

System 200 includes a user-interfaced computer 202 (e.g., desktop computer, laptop computer, tablet-based computer, etc.), an RFID reader 204, a programmable logic controller 206, a tank filling system 208, and a remotely-located database storage/memory 210 (hereinafter referred to as "database 210"). Computer 202 is the user-accessed interface to the tank monitoring functions provided by the present invention as well as (in the illustrated embodiment) the tank filling functions. As would be understood in the art, computer 202 will include user input devices (e.g., keyboard, mouse, microphone for voice recognition control, etc.), display and/or printing devices for data input/output review, internet connectivity devices (e.g., ethernet, wireless transceiver, etc.) for communication over the internet 500, and processing and storage devices needed to carry out its functions. The particular devices and/or their configurations are not limitations of the present invention.

RFID reader 204 is the device that will be used to read ID 21 associated with an RFID tag 20. For example, RFID reader 204 can be a handheld device that reads RFID tag 20 on a free-standing tank 100, and then communicates with computer 202 over a hard-wire or wireless connection to transmit the corresponding ID 21 to computer 202. RFID reader 204 can also be realized by a unique RFID antenna system that can be included as part of tank filling system 208 as will be explained later herein. Still further, system 200 could include both a handheld reader and the above-referenced unique RFID antenna system without departing from the scope of the present invention.

Programmable logic controller ("PLC") 206 can be realized by a variety of PLCs capable of controlling operation of a number of tank filling components (e.g., compressor(s), valves, sensors used to monitor a gas filling operation, etc.) based on set points received from computer 202. PLC 206 returns sensor data, monitored during a tank filling process, to computer 202.

Tank filling system 208 includes a number of hardware elements/systems that cooperate to fill a tank 100 with gas (e.g., a breathable gas) as controlled by computer 202 and PLC 206. For example, tank filling system 208 can include dome loading features to control the pressure of the gas during a tank filling operation. Briefly, dome loading is realized by the use of a proportional pneumatic controller (not shown) that is controlled by PLC 206 to provide a variable pneumatic signal to a fill control regulator (not shown). The dome-loaded fill control regulator's outlet pressure is thereby increased in proportion to the air pressure of the control air received from the proportional pneumatic controller.

All tank-related data (i.e., both static and dynamic data) is stored on database 210 that is accessed by computer 202 via internet 500 where each tank's data is referenced/indexed to the unique RFID tag ID 21 associated therewith. In this way, tank-related data is available in real-time to the user of computer 202 as well as any user of an authorized-user device 220 capable of accessing internet 500. Still further, if an organization employs multiple systems 200 at multiple locations, all such systems 200 have access to the same tank data in real-time. Accordingly, an organization can monitor/fill any of its tanks 100 from any of its systems 200.

Since system 200 only read's a tank's ID 21, tank monitoring and filling efficiency is improved by the very limited amount of data processing required of RFID reader 204 and computer 202. Further, since system 200 does not rely on a tank's RFID tag for tank data reads or writes, no pertinent tank data is ever at risk of loss due to RFID tag damage and no pertinent tank data is ever at risk of an erroneous read due to, for example, crosstalk in multi-tank environments. Still further, using the present invention, if a tank's RFID tag is ever damaged or otherwise compromised, a new RFID tag can be attached/installed on the tank and then associated with the existing cloud-based data without the need for any tank-data recovery.

As mentioned above, RFID reader 204 can be realized by a unique RFID antenna system that can be included as part of tank filling system 208. Details of the RFID antenna system are described in detail in U.S. patent application Ser. No. 15/619,746, the entire contents of which are hereby incorporated by reference and are included below to provide a complete understanding of the present invention and the advantages thereof.

Figure 2:
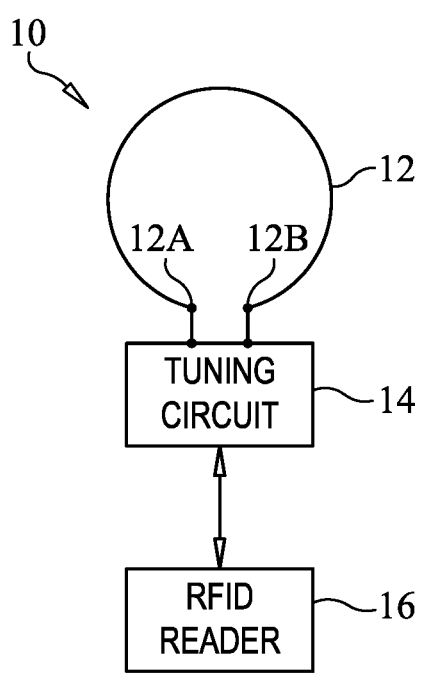
FIG. 2 is an isolated schematic view of an RFID antenna system for use in a compressed-gas tank filling system in accordance with an embodiment of the present invention.

Referring now to FIG. 2, an RFID antenna system that can be used for the above-described RFID reader 204 for use in compressed-gas tank filling system 208 is shown and is referenced generally by numeral 10. As will be explained further below, antenna system 10 can be used to read the ID for a variety of types of RFID tags. Furthermore, antenna system 10 assures that only an intended RFID tag is read and can be a low-power system to eliminate the possibility of crosstalk from any other nearby RFID tag.

Antenna system 10 includes a loop antenna 12, a tuning circuit 14, and an RFID reader 16. In general, loop antenna 12 is an electrically-conductive element shaped to define a substantially complete loop terminating in antenna feed points 12A and 12B. The geometric shape traced by loop antenna 12 can be circular, oval, rectangular, etc., without departing from the scope of the present invention. By way of example and for purpose of using antenna system 10 in compressed-gas tank filling system 208, loop antenna 12 will be assumed to trace a circular geometric shape for reasons that will be explained further below. Tuning circuit 14 is an adjustable device that, when coupled to antenna feed points 12A and 12B, allows the electrical impedance of loop antenna 12 to be tuned to match that of RFID reader 16. RFID reader 16 is electrically coupled to loop antenna 12 for two-way communication therewith via tuning circuit 14. RFID reader 16 can be any commercially-available or specially-designed RFID tag-reading device without departing from the scope of the present invention. Such RFID readers are well understood in the art and will, therefore, not be described further herein.

Figure 3:
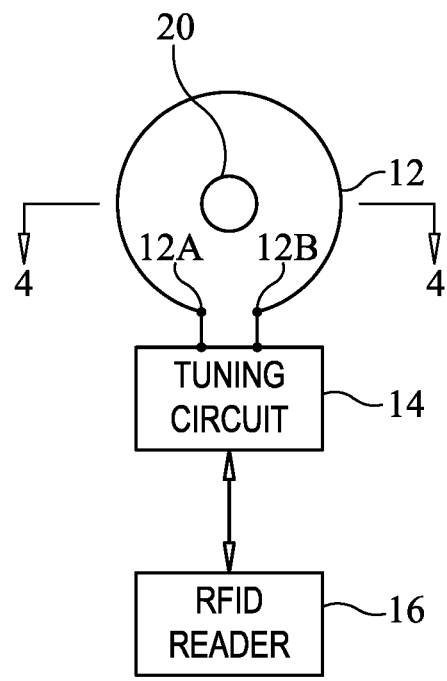
FIG. 3 is a schematic plan view of an RFID antenna system with an RFID tag disposed within the loop region defined within the system's loop antenna.
Figure 4:
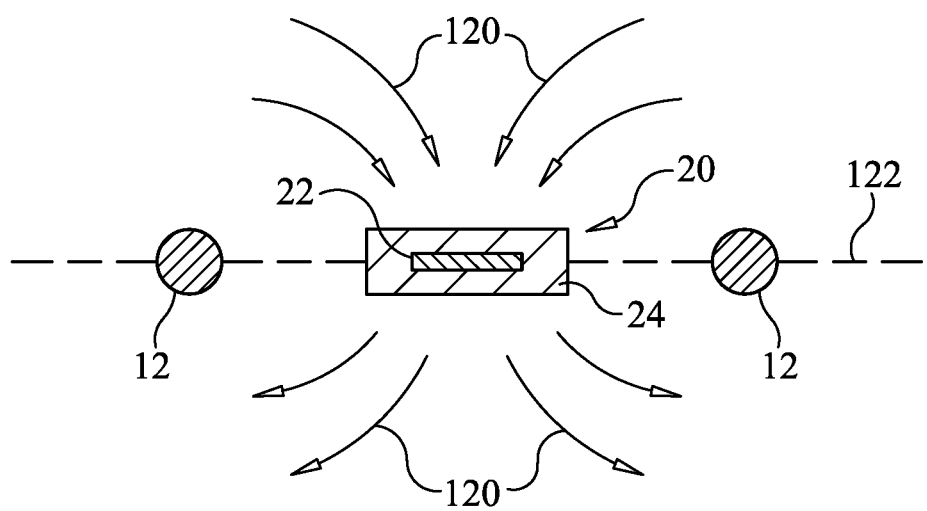
FIG. 4 is a cross-sectional view of the loop antenna and RFID tag taken along line 4-4 in FIG. 3 illustrating the antenna's reading field lines.

Antenna system 10 avoids or eliminates the above-described location-sensitivity, high-power, and crosstalk problems associated with the reading of RFID tags in a compressed-gas tank filling environment. To better explain how antenna system 10 overcomes these various RFID tag reading problems, reference will now be made to FIGS. 3 and 4 where an RFID tag 20 is positioned within the confines of loop antenna 12. The cross-sectional geometry of loop antenna 12 can be circular as shown in FIG. 4. However, it is to be understood that the cross-sectional geometry of loop antenna 12 could be other regular or irregular-shaped geometries without departing form the scope of the present invention.

As is known in the art of RFID technology, all RFID tags include a planar antenna that is most effectively interrogated or read when the field lines of a reading system's antenna are perpendicular to the plane of the planar antenna. In the illustrated embodiment, it will be assumed that a planar antenna 22 is embedded within a non-electrically-conducting material casing 24 of RFID tag 20 shown in FIG. 4. In accordance with the present invention, the field lines of loop antenna 12 are indicated by field lines 120 in FIG. 4 when RFID reader 16 is operated to read RFID tag 20. Field lines 120 will be perpendicular or substantially perpendicular to planar antenna 22 when RFID tag 20 is positioned such that planar antenna 22 is either aligned with the plane 122 defined by antenna loop 12, is parallel to plane 122 but still within field lines 120, or is canted at a small angle (e.g., approximately 15 degrees or less) relative to plane 122 but still within field lines 120.

Figure 5:
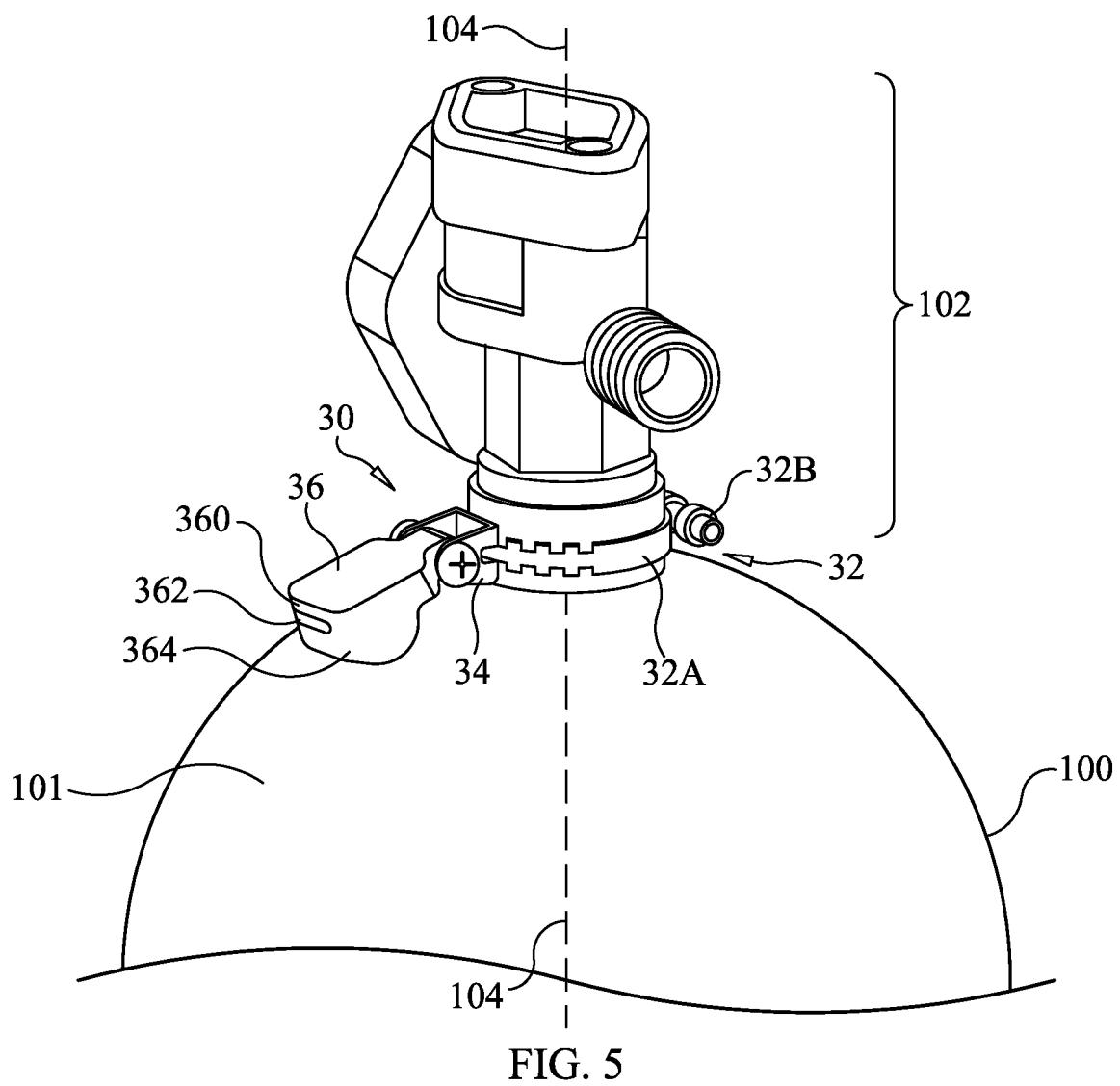
FIG. 5 is a perspective view of the top portion of a compressed-gas tank illustrating a perspective view of an RFID tag positioner in accordance with an embodiment of the present invention.

When the above-described RFID antenna system and RFID tag are to be incorporated into compressed-gas tank filling system 208, the present invention can include a novel positioning holder to hold RFID tag 20 in a position/orientation that assures the above-described relationship between the loop antenna's field lines and the RFID tag's planar antenna. For example and with reference to FIG. 5 where the top portion of a compressed-gas tank 100 (e.g., a SCBA cylinder) is illustrated, an RFID tag positioner 30 is coupled to tank 100 at its valve fixture 102, the design of which is not a limitation of the present invention. Briefly, tag positioner 30 includes an attaching collar 32 coupled to tank 100, a locking bracket 34 coupled to collar 32, and an RFID tag supporting holder 36 coupled to locking bracket 34 (e.g., via a screw attachment thereto. Collar 32 can include an adjustable-length strap 32A passively or actively tightened about valve fixture 102 by, for example, a screw clamp 32B.

Figure 6:
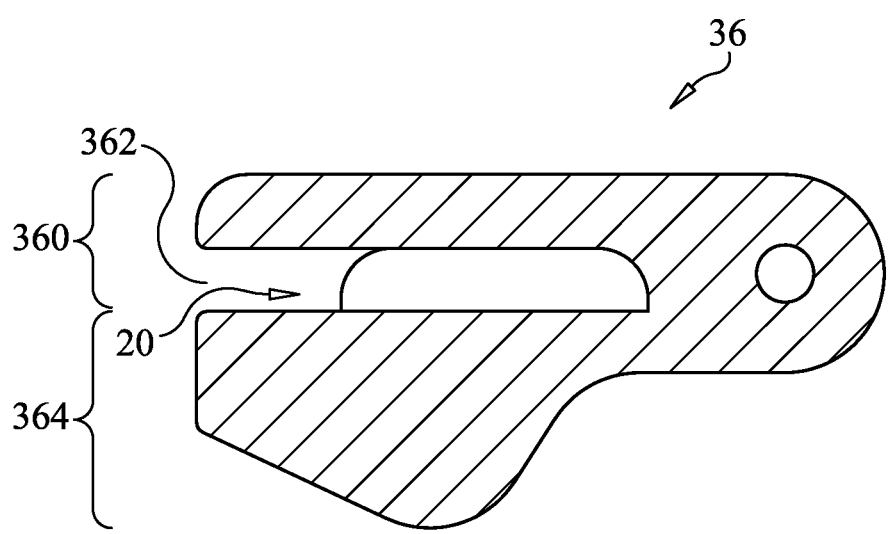
FIG. 6 is an isolated cross-sectional view of the RFID tag holder in accordance with an embodiment of the present invention.

Additional and simultaneous reference will now be made to FIG. 6 where supporting holder 36 is shown in an isolated cross-sectional view thereof. Supporting holder 36 is made from an electromagnetic (EM) energy transparent material(s) (e.g., rubber, fiberglass, plastic, wood, cloth, and combinations thereof). Supporting holder 36 is configured to support an RFID tag 20 therein. When supporting holder 36 with RFID tag 20 therein is included in a tag positioner 30 attached to a valve fixture 102 of a tank 100, RFID tag 20 will be placed in an orientation that positions the plane of the planar antenna of the RFID tag in a perpendicular or near perpendicular orientation relative to the longitudinal axis 104 of tank 100. More specifically, supporting holder 36 includes a tag housing region 360 and a tag positioning leg 364. Tag housing region 360 includes a slot 362 that provides for the insertion of an RFID tag 20 therein such that it is captured within tag housing region 360. Once RFID tag 20 has been inserted into slot 362, the opening of slot 362 can be sealed. When a tag positioner 30 (inclusive of supporting holder 36 and RFID tag 20) is attached to valve fixture 102, positioning leg 364 places slot 362 (and the antenna of RFID tag 20 positioned therein) perpendicular (or nearly perpendicular) to the tank's longitudinal axis 104 at the crown region of tank 100.

Figure 7:
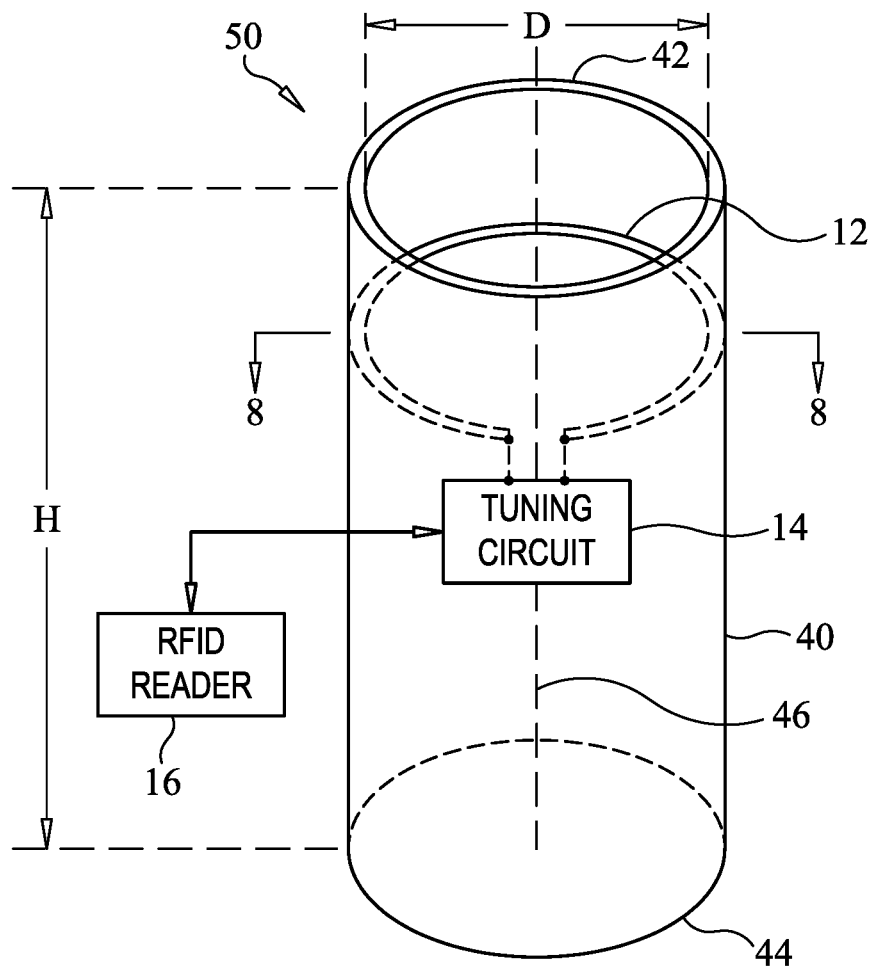
FIG. 7 is a part side and part schematic view of an RFID-based tank support system for a compressed-gas tank filling system in accordance with an embodiment of the present invention.
Figure 8:
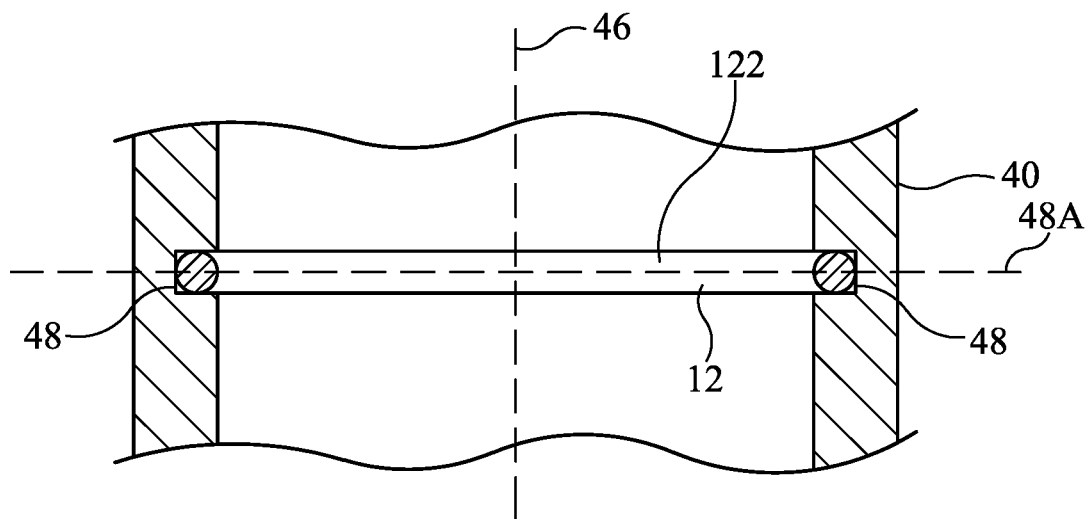
FIG. 8 is an enlarged cross-sectional view of a portion of the tank container and antenna taken along line 8-8 in FIG. 7.

The above-described antenna system can be included as part of an RFID-based tank support system for compressed-gas tank filling system 208 as will now be described with simultaneous reference to FIGS. 7 and 8. FIG. 7 illustrates an embodiment of an RFID-based tank support system 50 for a compressed-gas tank filling machine (not shown), and FIG. 8 is a cross-sectional view of the system's container 40 taken along line 8-8 in FIG. 7.

Tank support system 50 provides mechanical support for a compressed-gas tank or cylinder (not shown) during a tank filling operation, while simultaneously providing for the reading of an RFID tag coupled to the tank. For example, the RFID tag could be RFID tag 20 held in place using tag positioner 30 as described above with reference to FIG. 5. Tank support system 50 includes a hollow container 40 having an open (top) end 42 and a closed (bottom) end 44, as well as previously-described loop antenna 12, tuning circuit 14, and RFID reader 16. Container 40 can be a circular cylinder having an inside diameter "D" sufficient to provide for the loading of a compressed-gas tank. The length or height "H" of container 40 should be sufficient to substantially or fully contain a compressed-gas tank loaded therein.

Positioned near open top 42 of container 40 is loop antenna 12. In general, loop antenna 12 is coupled to the sidewall region of container 40 with its loop plane perpendicular to the longitudinal axis 46 of container 40. Thus, for a container 40 that is a circular cylinder, loop antenna 12 is a circular loop antenna. Loop antenna 12 is positioned at a location along the length of container 40 that is approximately commensurate with the above-described crown region of a compressed-gas tank when such a tank is in container 40. For example, when the above-described tag positioner 30 and RFID tag 20 are to be used in combination for a particular type of tank that is to be serviced by tank support system 50, loop antenna 12 can be positioned along container such that its plane 122 will be approximately aligned with the portion of a tank at which tag positioner 30 positions a captured RFID tag as described above and as illustrated in FIG. 9 where a tank 100 has been placed/positioned in container 40.

Figure 9:
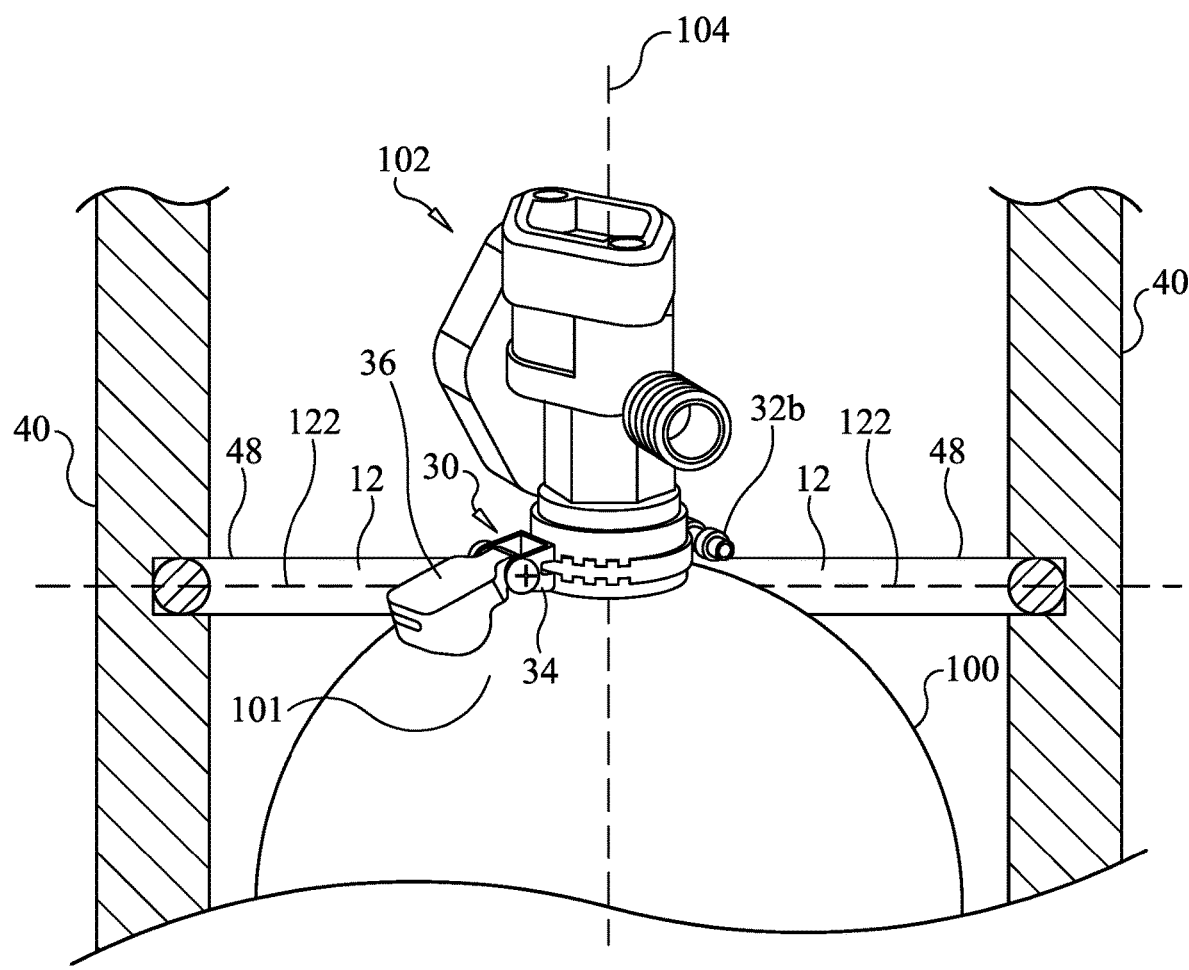
FIG. 9 is a cross-sectional view of a portion of a tank container illustrating the relationship between the container's loop antenna and an RFID tag positioner attached to a compressed-gas tank in accordance with an embodiment of the present invention.

Container 40 can serve as the mechanical support for the geometric shape of loop antenna 12. For example, when container 40 is a circular cylinder, container 40 can readily provide the mechanical support for a circular geometric shape of loop antenna 12. The loop antenna can be an electrically-conductive wire, flat strip, etc., mounted on the inside surface of container 40, embedded fully or partially within the walls container 40, or mounted on the outside surface of container 40 without departing from the scope of the present invention. For example, in the embodiment illustrated in FIG. 8, loop antenna 12 resides in an inward-facing and contiguous annular notch 48 defined in the sidewall of container 40 to thereby support and protect loop antenna 12. Notch 48 lies in a plane 48A that is perpendicular to longitudinal axis 46 of container 40 to thereby assure perpendicularity between plane 122 of loop antenna 12 and longitudinal axis 104 of a tank 100 that is to be placed in container 40 as illustrated in FIG. 9.

Tuning circuit 14 is electrically coupled to loop antenna 12 and can be mounted on container 40 to facilitate its usage. Another advantage of mounting tuning circuit 14 on container 40 is that tank support system 50 can be readily and accurately tuned in a factory environment thereby allowing it to function as a "plug in" module of a compressed-gas tank filling machine. RFID reader 16 can be mounted on container 40 or located near container 40 without departing from the scope of the present invention. Container 40 can be made completely of one or more non-magnetic, non-electrically-conducting material(s) to prevent any interference with the reading field of loop antenna 12. At a minimum, container 40 should exhibit non-magnetic and non-conducting properties in the vicinity of the reading field of loop antenna 12. For example, suitable materials for container 40 include, but are not limited to, rubber, fiberglass, plastic, wood, cloth, and combinations thereof.

Figure 10:
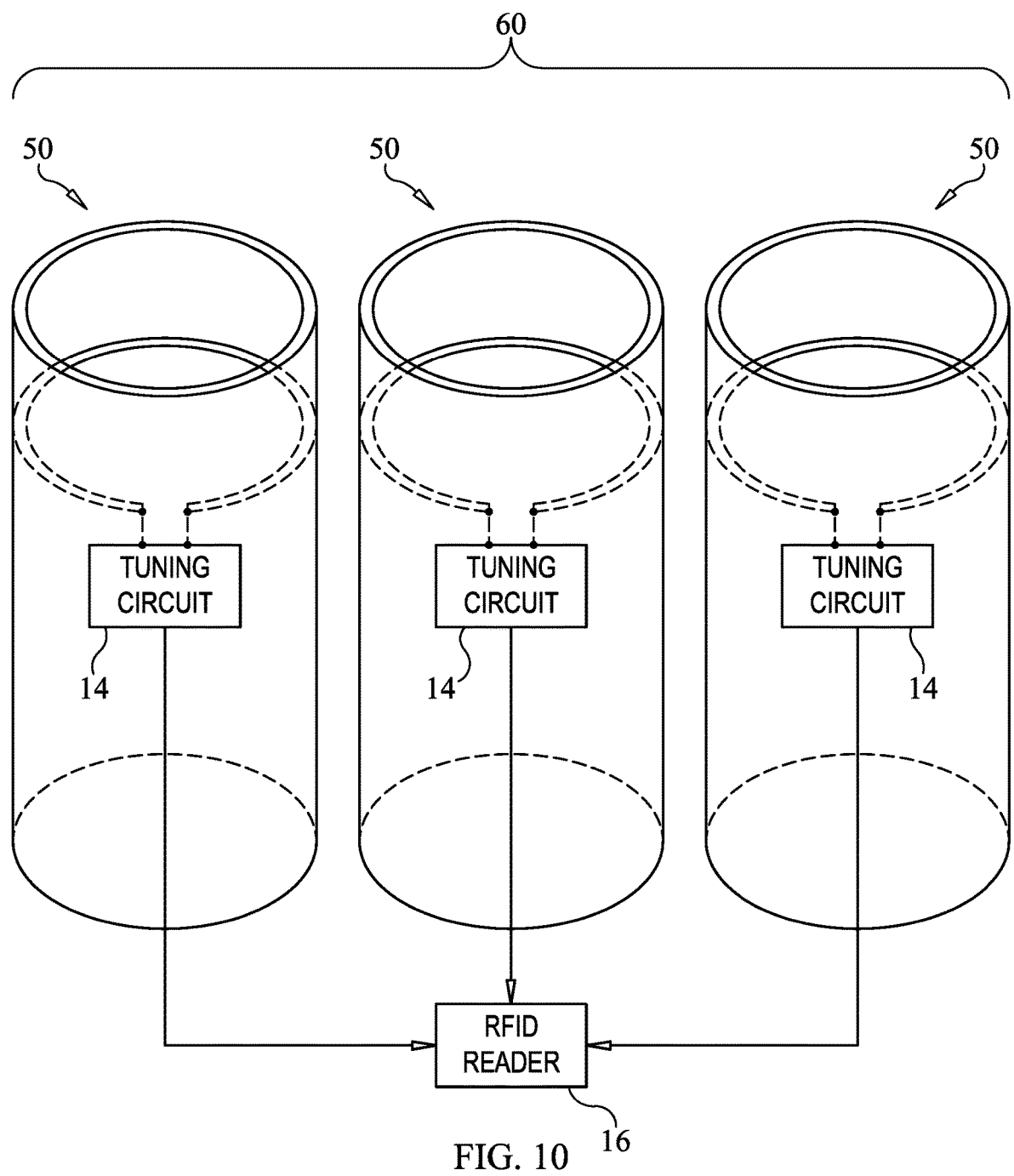
FIG. 10 is a part side and part schematic view of a multiple-container RFID-based tank support system in accordance with another embodiment of the present invention.

Tank support system 50 employing the loop antenna-based RFID tag reading system as described herein reduces the power requirements needed to accurately read an RFID tag on a compressed-gas tank positioned in the system's container 40. Typical power output of the RFID reader need only be on the order of 1 watt or less. At such low power levels, tank support system 50 will not be subject to cross-talk interference from any other nearby RFID tags not in container 40. Furthermore, the low-power and no crosstalk features and advantages of tank support system 50 make it an ideal candidate for clustering in a multiple container tank filling machine. For example and with reference to FIG. 10, a multiple-container RFID-based tank support system 60 uses a plurality of tank support systems 50 in a side-by-side arrangement. While three tank support systems 50 are illustrated, more or fewer could be used without departing from the scope of the present invention. All tank support systems 50 can be coupled to a single RFID reader 16 (as shown), or each tank support system 50 could have its own dedicated RFID reader coupled thereto without departing from the scope of the present invention.

Figure 11:
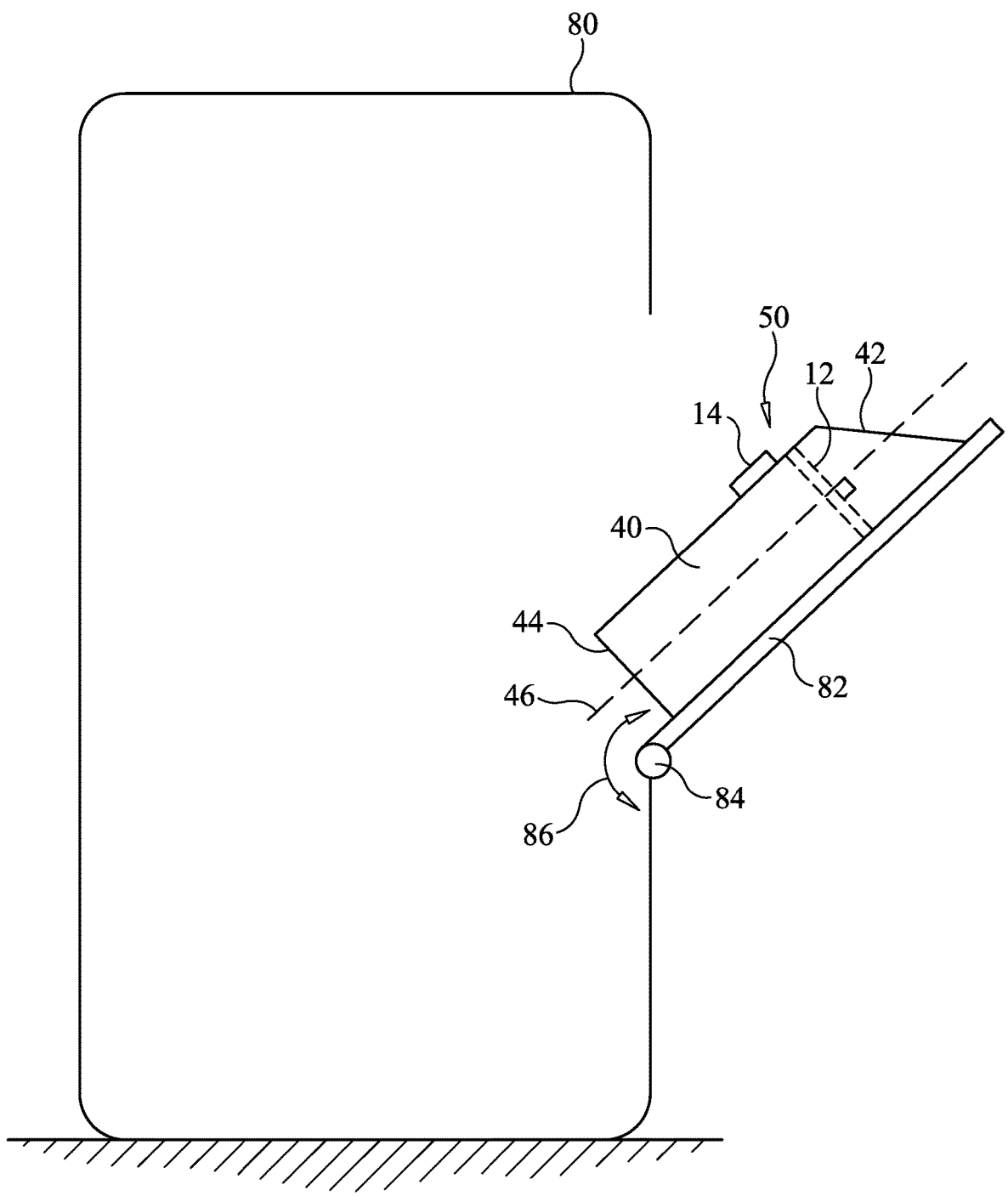
FIG. 11 is a side view of a compressed-gas tank filling machine illustrating the tank support system incorporated into a door of the tank filling machine.

A single tank support system 50 or multiple-container tank support system 60 can be incorporated into an automated compressed-gas tank filling machine. For example and with reference to FIG. 11, a compressed-gas tank filling machine 80 is shown with the tank support system's supporting door open and indicated by reference numeral 82. Door 82 is coupled to machine 80 by a hinge 84 that allows door 82 to rotate into or out of machine 82 as indicated by two-headed arrow 86. It is to be understood that machine 80 includes numerous other mechanical and electrical elements/systems omitted from FIG. 11 for clarity of illustration. Mounted on door 82 is one (or more) tank support system 50. Open top 42 of container 40 can be angled as shown to facilitate the insertion/removal of a compressed-gas tank and/or the opening/closing of door 82.

In use, an operator would load a compressed gas tank into container 40 and couple the tank filling equipment (not shown) thereto. The tank can have an RFID tag positioner (not shown) coupled thereto as described above and as shown in FIG. 4. Door 82 could then be rotated towards machine 80 such that containment system 50 is fully within machine 80. Reading of the RFID tag's ID associated with a tank in tank support system 50 can then be commenced and the RFID tag ID can be used by machine 80 to access tank-related data stored on database 210 (FIG. 1) as described earlier herein. The tank-related data read/retrieved only from database 210 is then used by computer 202 to issue set points to PLC 206 in order to carry out the tank-filling operation by tank filling system 208.

The advantages of the present invention are numerous. The compressed-gas data storing and monitoring system is ideally suited to be incorporated with a tank filling system to provide tank-related data that is used and/or updated for efficient, safe, and secure tank filling and re-filling operations. Only the tank's associated RFID tag ID need be read thereby simplifying processing and recovery in the event of RFID tag destruction or failure. All tank-related data is readily available across a variety of platforms to include multiple monitoring/filling stations utilized by the same organization thereby allowing any station to service any tank efficiently, safely, and securely at any of the organization's stations.

The present invention can use the tank support system incorporating tank identification as described herein to accurately read just the intended RFID tag's ID coupled to a gas tank in the tank support system. The system's ability to use a low-power RFID reader allows multiple tank support systems to be clustered together without any crosstalk concerns. Furthermore, since the system's antenna is sensitive to RFID tags that only lie within the confines of the antenna's loop and since the antenna can operate at low power levels on the order of 1 watt, the antenna is not affected by nearby electrically-conductive structures located outside of the antenna loop's perimeter. Use of the tag positioner described herein on a tank further assures optimum RFID tag placement for efficient and accurate reading of an RFID tag. Thus, the tank support system described herein is an ideal candidate for incorporation into a compressed-gas tank filling machine that typically includes a large amount of electrically-conductive structural materials. For all of the above reasons, the invention described herein will greatly improve the efficiency and safety of compressed-gas tank filling operations.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A tank data storing and monitoring system, comprising:
   an RFID tag adapted to be coupled to and associated with a tank, said RFID tag having a unique identity specified by a unique identifier stored electronically on said RFID tag;
   a computer adapted to access the internet;
   a database adapted to be accessible via the internet, said database storing all data uniquely associated with the tank having said RFID tag coupled thereto; and
   an RFID reader coupled to said computer, said RFID reader reading only said unique identifier of said RFID tag,
   wherein said computer accesses said data unique to the tank stored only on said database using said unique identifier.

2. A tank data storing and monitoring system, comprising:
   an RFID tag adapted to be coupled to and associated with a tank, said RFID tag having a unique identity specified by a unique identifier stored electronically on said RFID tag;
   a computer adapted to access the internet;
   a database adapted to be accessible via the internet, said database storing data unique to the tank having said RFID tag coupled thereto;
   an RFID reader coupled to said computer, said RFID reader reading only said unique identifier of said RFID tag, wherein said computer accesses said data unique to the tank stored on said database using said unique identifier;
   a hollow open-top container having a contiguous sidewall region and a bottom region coupled to said sidewall region, said sidewall region including a contiguous notch facing radially into said container wherein said notch lies in a plane perpendicular to a longitudinal axis of said container, said container made at least partially from a non-magnetic and non-conducting material; and
   a loop antenna disposed in said notch and electrically coupled to said RFID reader.

3. A tank data storing and monitoring system as in claim 2, wherein only said unique identifier is electronically stored on said RFID tag.

4. A tank data storing and monitoring system as in claim 2, further comprising a tuning circuit coupled to said loop antenna and said RFID reader for adjusting electrical impedance of said loop antenna.

5. A tank data storing and monitoring system as in claim 2, wherein said loop antenna comprises a circular loop antenna.

6. A tank data storing and monitoring system as in claim 2, wherein said sidewall region comprises a circular cylinder.

7. A tank data storing and monitoring system as in claim 2, wherein said loop antenna lies in a plane perpendicular to a longitudinal axis of said container.

8. A tank data storing and monitoring system, comprising:
   an RFID tag adapted to be coupled to and associated with a tank, said RFID tag having a unique identity specified by a unique identifier stored electronically on said RFID tag;
   a computer adapted to access the internet;
   a database adapted to be accessible via the internet, said database storing data unique to the tank having said RFID tag coupled thereto;
   an RFID reader coupled to said computer, said RFID reader reading only said unique identifier of said RFID tag, wherein said computer accesses said data unique to the tank stored on said database using said unique identifier;
   a hollow open-top container having a contiguous sidewall region and a bottom region coupled to said sidewall region, said container made at least partially from a non-magnetic and non-conducting material;
   a loop antenna coupled to a portion of said sidewall region of said container and electrically coupled to said RFID reader;
   a collar adapted to be coupled to the tank; and
   a tag holder coupled to said collar, said tag holder being transparent to electromagnetic energy, said tag holder including a first region having a slot extending from an edge of said first region wherein said RFID tag is disposed in said slot, said tag holder including a second region extending from said first region wherein, when said collar with said tag holder coupled thereto is coupled to the tank such that second region of said tag holder is adapted to be in contact with the tank, said slot is approximately perpendicular to a longitudinal axis of the tank.

9. A tank data storing and monitoring system as in claim 8, wherein said collar is adjustable in size.

10. A tank data storing and monitoring system as in claim 8, further comprising a tuning circuit coupled to said loop antenna and said RFID reader for adjusting electrical impedance of said loop antenna.

11. A tank data storing and monitoring system as in claim 8, wherein said loop antenna comprises a circular loop antenna.

12. A tank data storing and monitoring system as in claim 8, wherein said sidewall region comprises a circular cylinder.

13. A tank data storing and monitoring system as in claim 8, wherein said loop antenna lies in a plane perpendicular to a longitudinal axis of said container.

14. A tank data storing and monitoring system, comprising:
   an RFID tag adapted to be coupled to and associated with a tank, said RFID tag having a unique identity specified by a unique identifier stored electronically on said RFID tag;
   a computer adapted to access the internet;
   a database adapted to be accessible via the internet, said database storing data unique to the tank having said RFID tag coupled thereto;
   an RFID reader coupled to said computer, said RFID reader reading only said unique identifier of said RFID tag, wherein said computer accesses said data unique to the tank stored on said database using said unique identifier;
a hollow cylinder having a closed end and an open end, said cylinder made at least partially from a non-magnetic and non-conducting material, said cylinder having a longitudinal axis, said cylinder including a contiguous notch traversing at least a portion of an inner circumference of said cylinder and facing radially into said cylinder; and
a loop antenna residing in said notch and electrically coupled to said RFID reader, wherein said loop antenna lies in a plane perpendicular to said longitudinal axis of said cylinder.

15. A tank data storing and monitoring system as in claim 14, further comprising a tuning circuit coupled to said loop antenna and said RFID reader for adjusting electrical impedance of said loop antenna.

16. A tank data storing and monitoring system, comprising:
a hollow open-top container adapted to hold a tank therein, said container having a contiguous sidewall region and a bottom region coupled to said sidewall region, said container made at least partially from a non-magnetic and non-conducting material;
a loop antenna coupled to a portion of said sidewall region of said container;
an RFID tag adapted to be coupled to and associated with the tank positioned in said container, said RFID tag having a unique identity specified by a unique identifier stored electronically on said RFID tag;
a computer adapted to access the internet;
a database adapted to be accessible via the internet, said database storing data unique to the tank having said RFID tag coupled thereto; and
an RFID reader coupled to said computer and said loop antenna for reading only said unique identifier of said RFID tag,
wherein said computer accesses said data unique to the tank stored on said database using said unique identifier.

17. A tank data storing and monitoring system as in claim 16, wherein only said unique identifier is electronically stored on said RFID tag.

18. A tank data storing and monitoring system as in claim 16, wherein said sidewall region includes a contiguous notch facing radially into said container in a plane perpendicular to a longitudinal axis of said container, and wherein said loop antenna is disposed in said notch.

19. A tank data storing and monitoring system as in claim 16, further comprising a tuning circuit coupled to said loop antenna and said RFID reader for adjusting electrical impedance of said loop antenna.

20. A tank data storing and monitoring system as in claim 16, wherein said loop antenna comprises a circular loop antenna.

21. A tank data storing and monitoring method, comprising the steps of:
providing an RFID tag adapted to be coupled to and associated with a tank, said RFID tag having a unique identity specified by a unique identifier stored electronically on said RFID tag;
providing a computer adapted to access the internet;
providing a database adapted to be accessible via the internet, said database storing all data uniquely associated with the tank having said RFID tag coupled thereto;
providing an RFID reader coupled to said computer;
reading only said unique identifier of said RFID tag using said RFID reader wherein said computer is provided with said unique identifier; and
accessing, using said computer, said data unique to the tank stored only on said database using said unique identifier, wherein the tank is filled based only on said data unique to the tank stored on said database.

22. A tank data storing and monitoring method, comprising the steps of:
providing an RFID tag adapted to be coupled to and associated with a tank, said RFID tag having a unique identity specified by a unique identifier stored electronically on said RFID tag;
providing a computer adapted to access the internet;
providing a database adapted to be accessible via the internet, said database storing data unique to the tank having said RFID tag coupled thereto;
providing an RFID reader coupled to said computer;
reading only said unique identifier of said RFID tag using said RFID reader wherein said computer is provided with said unique identifier; and
accessing, using said computer, said data unique to the tank stored on said database using said unique identifier, wherein the tank is filled based only on said data unique to the tank stored on said database; and
placing the tank in a hollow open-top container prior to said step of reading, said container having a contiguous sidewall region and a bottom region coupled to said sidewall region, said container having a loop antenna coupled to a portion of said sidewall region and electrically coupled to said RFID reader, said container being made at least partially from a non-magnetic and non-conducting material.

23. A method according to claim 22, wherein only said unique identifier is electronically stored on said RFID tag.

24. A method according to claim 22, further comprising the step of updating said data unique to the tank stored on said database after the tank is filled.

25. A method according to claim 22, wherein said loop antenna is disposed in a notch of said sidewall region, said notch facing radially into said container in a plane perpendicular to a longitudinal axis of said container.

26. A method according to claim 22, further comprising the steps of:
placing said RFID tag in a tag holder transparent to electromagnetic energy, said tag holder including a first region having a slot extending from an edge of said first region wherein said RFID tag is disposed in said slot, said tag holder including a second region extending from said first region; and
coupling said tag holder with said RFID tag disposed therein adjacent a filling fixture of the tank with said second region in contact with the tank so that an antenna of said RFID tag is approximately perpendicular to a longitudinal axis of the tank prior to said step of reading.

* * * * *